(12) United States Patent
Wang (10) Patent No.: US 8,777,601 B2
(45) Date of Patent: Jul. 15, 2014

(54) MANUFACTURING DEVICE OF HIGH MODULUS GRAPHITE FIBER

(75) Inventor: Chih-Yung Wang, Zhongli (TW)

(73) Assignee: UHT Unitech Co., Ltd., Zhongli (TW)

( * ) Notice: Subject to any disclaimer, the term of this patent is extended or adjusted under 35 U.S.C. 154(b) by 137 days.

(21) Appl. No.: 13/562,540

(22) Filed: Jul. 31, 2012

(65) Prior Publication Data

US 2014/0037776 A1 Feb. 6, 2014

(51) Int. Cl.
*D01D 10/02* (2006.01)
*D01D 11/06* (2006.01)

(52) U.S. Cl.
USPC .......... 425/113; 219/686; 219/759; 425/174.4

(58) Field of Classification Search
USPC ................. 425/113, 174.4; 423/447.8, 447.9; 219/686, 759
See application file for complete search history.

(56) References Cited

U.S. PATENT DOCUMENTS

| 3,627,570 | A | * | 12/1971 | Cass et al. ................... 427/377 |
| 3,692,577 | A | * | 9/1972 | Evans ........................ 427/590 |
| 3,723,157 | A | * | 3/1973 | Druin ......................... 427/175 |
| 4,197,282 | A | * | 4/1980 | Bailly-Lacresse et al. 423/447.4 |
| 6,027,337 | A | * | 2/2000 | Rogers et al. ................ 432/64 |
| 6,967,014 | B1 | * | 11/2005 | Olry et al. ................. 423/447.9 |
| 7,786,253 | B2 | * | 8/2010 | Paulauskas et al. ....... 118/723 E |
| 7,824,495 | B1 | * | 11/2010 | White et al. ................. 118/718 |

* cited by examiner

*Primary Examiner* — Robert B Davis
(74) *Attorney, Agent, or Firm* — Jackson IPG PLLC (57) ABSTRACT

A manufacturing device includes a material supply module, a winding machine as well as a low-temperature furnace, a tension wheel set, a microwave graphitization module and a gluing module sequentially installed between the material supply module and the winding machine, so that a carbon fiber raw material can be manufactured continuously in mass production to enhance the graphitization efficiency and lower the process cost significantly.

17 Claims, 7 Drawing Sheets

MANUFACTURING DEVICE OF HIGH MODULUS GRAPHITE FIBER

FIELD OF THE INVENTION

The present invention relates to a manufacturing device of high modulus graphite fibers, in particular to the manufacturing method capable of continuously manufacturing high modulus graphite fiber in mass production.

BACKGROUND OF THE INVENTION

Carbon fiber features low specific gravity, high tensile strength, high modulus, high electric conductivity, and high thermal conductivity and has the advantage of a soft fiber that can be woven. After being processed by high temperature, the carbon fiber is a fiber material with a carbon content of more than 90%. The carbon fibers can be classified into different types according to different methods including the classification by raw material, feature, processing temperature and shape. When the carbon fibers are classified according to the raw material, there are six types, respectively: a cellulose-fiber rayon series, a lignin series; a polyacrylonitrile (PAN) series; a pitch series, a phenol resin series, and a gas carbon fiber series. When the carbon fibers are classified according to the features such as mechanical strength and the modulus, there are five types of carbon fibers as listed below:

(1) Ultra-high module fiber with a tensile modulus greater than 600 GPa;
(2) High module fiber with a tensile modulus with a range of 350~600 GPa;
(3) Mid module fiber with a tensile modulus with a range of 280~350 GPa;
(4) Standard module fiber with a tensile modulus with a range of 200~280 GPa; and
(5) Low module fiber with a tensile modulus smaller than 200 GPa.

Wherein, the tensile modulus is defined as the level of easiness of deforming an object by a force. The higher the modulus, the more difficult is the object to be deformed. A special carbon fiber with a high modulus is used extensively as an enhanced composite material for construction, aviation, and military. Therefore, it is an important subject for related manufacturers to manufacture a fiber with higher modulus.

Figure 1:
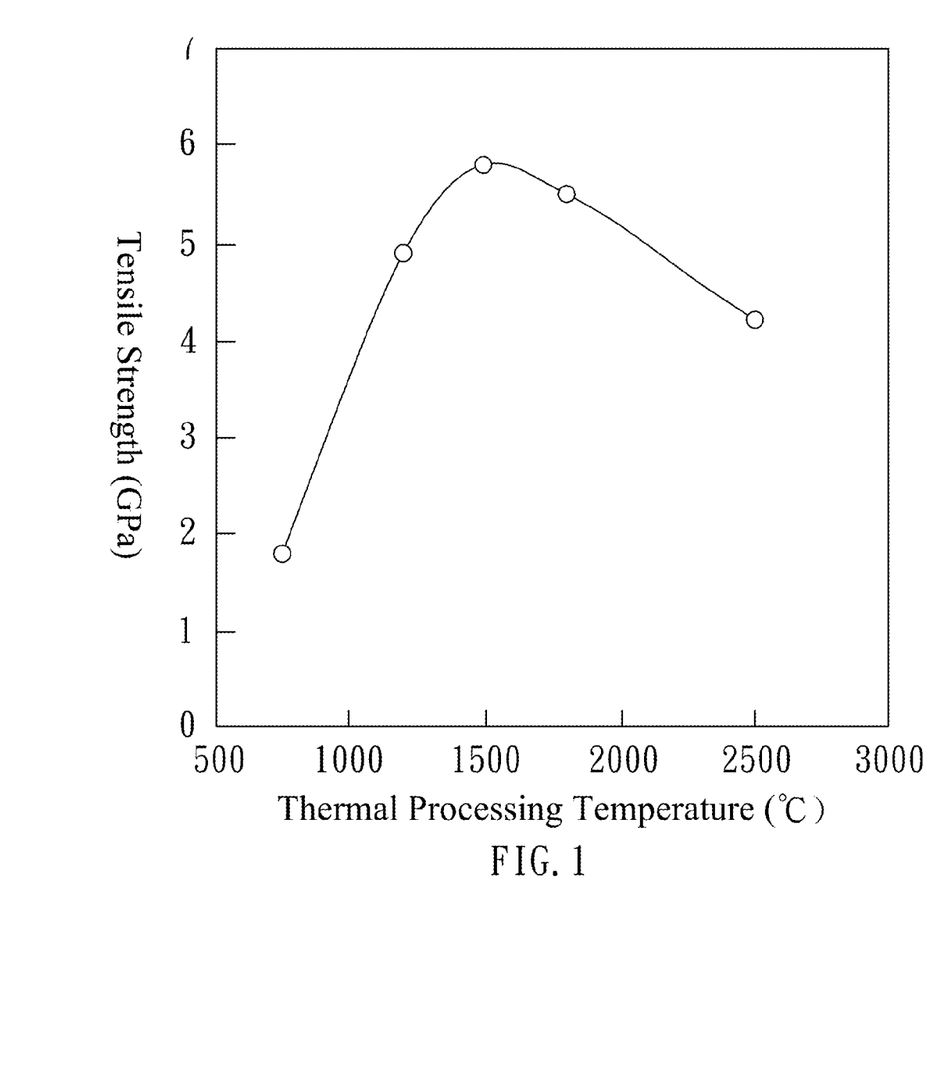
FIG. 1 is a tensile strength versus thermal processing temperature graph of a carbon fiber carbonization
Figure 2:
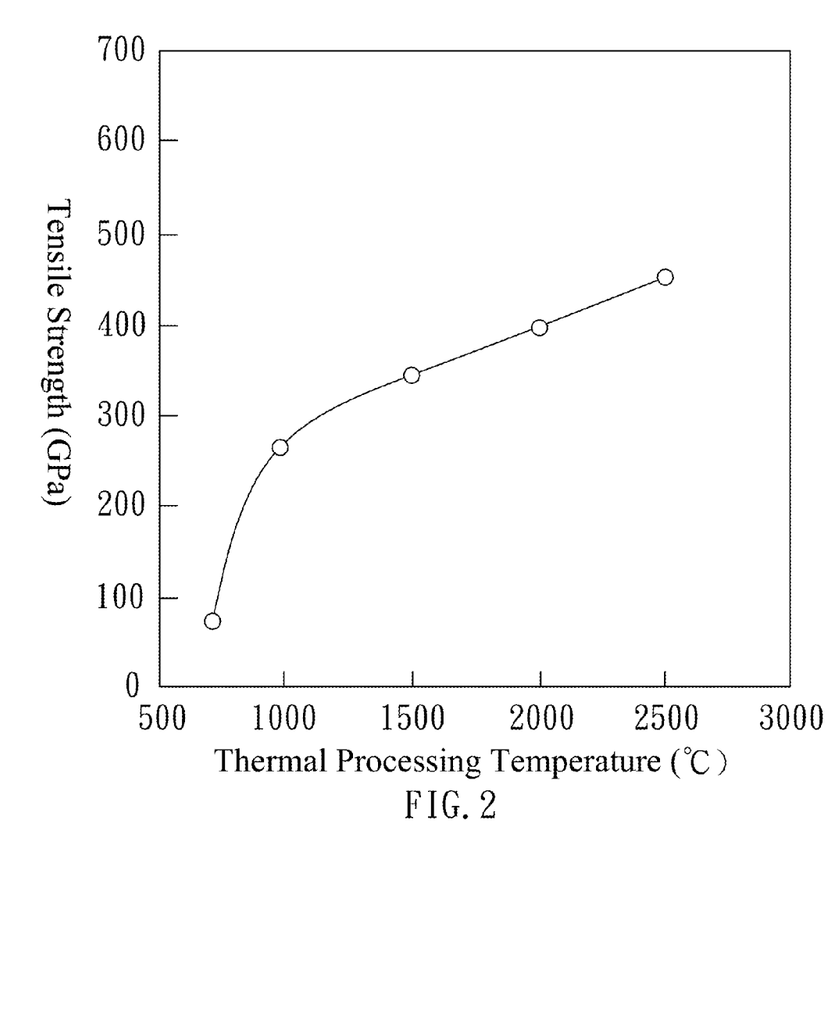
FIG. 2 is a tensile modulus versus thermal processing temperature graph of a carbon fiber carbonization.

In FIG. 1, the carbonization temperature rises during the manufacture of carbon fibers to increase the fiber strength, but the fiber strength will remain at a saturation point after the fiber graphitization reaches an ultra high temperature over 2,000° C., and then the temperature fiber strength starts dropping and the modulus will increase instead. In FIG. 2, the modulus decreases with the fiber strength when the graphitization process temperature increases (up to 2,000~2,500° C.).

In the future trend, high-strength high-modulus carbon fibers are produced with a low cost. If the graphitization temperature of the raw material of a general high-strength carbon fiber is increased, the module may be increased, but a significant drop of strength will result. Therefore, it is a main subject for manufacturers to improve the level of graphitization stacking and the performance of modulus while maintaining the high strength of the high-strength carbon fibers.

Among the conventional carbon fiber manufacturing technologies, different heating graphitization methods are used in high temperature graphitization and graphitization process, and some of the common conventional thermoelectric finance type graphitization processes as disclosed in Japan Pat. No. JP200780742, R.O.C. Pat. Nos. 561207, 200902783 and 279471 focus on improving the manufacturing processes that adopt a conventional thermoelectric furnace. In other words, a high temperature furnace is used for heating in the carbonization process, and different heat exchange methods are used to transmit heat energy from the outside to the inside while heating the external cavity, insulation facility, protective atmosphere and fiber. However, the drawbacks reside on low heat conduction, difficult insulation, taking too much time to heat to the desired temperature since the temperature rising speed is affected by the heat conduction effect, and the graphitization and carbonization process takes over 1~10 hours, so that the high modulus carbon fiber manufacturing process generally fails to take the high strength into consideration. In general, the heating method not only takes a long time, but also wastes unnecessary energy. In addition, a large quantity of insulation devices is required for a good heat insulation system to prevent heat loss of the high temperature electric furnace. The required graphitization furnace and the increased cost make the mass production difficult and increase the cost of the carbon fibers.

SUMMARY OF THE INVENTION

In view of the aforementioned problems of the prior art, it is a primary objective of the present invention to provide a manufacturing device capable of continuously manufacturing high modulus graphite fibers in mass production.

To achieve the aforementioned objective, the present invention provides a manufacturing device comprising: a material supply module, a winding machine as well as a low-temperature furnace, a microwave graphitization module and a gluing module sequentially installed between the material supply module and the winding machine, wherein an end of the raw material of the carbon fibers is wound to the material supply module, and the other end is manufactured to a finished good of a high modulus graphite fiber and then wound to the material receiving element, and the raw material of the carbon fibers passes through the low-temperature furnace to remove a protective film on the surface of the raw material of the carbon fiber, and through the microwave graphitization module to perform a graphitization of the raw material of the carbon fibers to produce a graphite fiber semi-finished good, and finally through the gluing module to perform a gluing process of the graphite fiber semi-finished good to produce a high modulus graphite fiber finished good to be wound onto the winding machine.

With the aforementioned manufacturing device, the carbon fiber raw material can be manufactured into high modulus graphite fibers, wherein the high modulus graphite fiber has a tensile modulus of 270~650 GPa, and a plurality of crystal structures with a thickness (Lc) of 20~70 angstroms, and thus the carbon fibers can be used extensively as an enhanced composite material for construction, aviation, and military. With the manufacturing device of the present invention, the raw material of the carbon fibers is manufactured continuously in mass production to enhance the graphitization efficiency and lower the process cost significantly.

To achieve the foregoing objective, the present invention further comprises first and second tension wheel sets installed at the front and the rear of the microwave graphitization module respectively, and the first and second tension wheel sets having a plurality of wheels, so that the first and second tension wheel sets maintain a certain tension of the raw material of the carbon fibers and pass the raw material of the carbon fibers through microwave graphitization module at a specific speed.

To achieve the foregoing objective, the present invention further comprises a thermal bake-dry module installed between the material supply module and the winding machine and coupled to the rear of the gluing module for baking dry and shaping the graphite fiber semi-finished good.

To achieve the foregoing objective, the present invention provides a microwave cavity in an elliptical shape or a flat-plate shape.

To achieve the foregoing objective, the present invention further comprises a wave absorbing structure installed in the microwave cavity for enhancing the focusing effect in the microwave cavity.

To achieve the foregoing objective, the present invention further provides a gas supply module for supplying an inert gas into the microwave cavity.

DESCRIPTION OF THE PREFERRED EMBODIMENTS

The technical characteristics of the present invention will become apparent with the detailed description of the preferred embodiments accompanied with the illustration of related drawings as follows.

Figure 3:
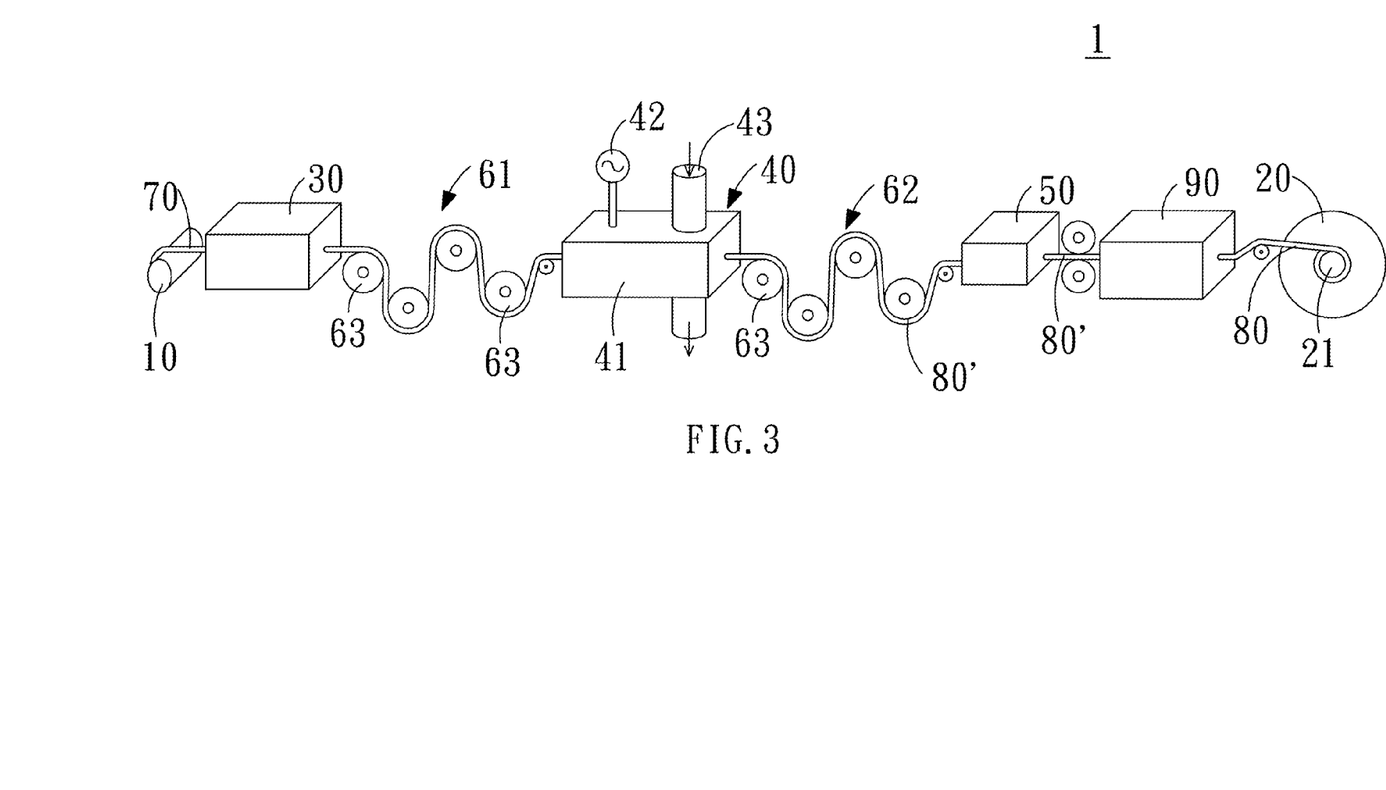
FIG. 3 is a schematic view of a manufacturing device of the present invention.

With reference to FIG. 3 for a schematic view of a manufacturing device of the present invention, the manufacturing device 1 comprises a material supply module 10, a winding machine 20, a low-temperature furnace 30, a microwave graphitization module 40 and a gluing module 50.

The material supply module 10 is provided for supplying a carbon fiber raw material 70, wherein the carbon fiber raw material 70 is a polyacrylonitrile (PAN) fiber, a pitch fiber, a phenol fiber, or a combination of the above obtained after thermal processing.

The winding machine 20 is installed at the rear of the material supply module 10 and includes at least one material receiving element 21, wherein an end of the carbon fiber raw material 70 is wound to the material supply module 10, and the other end is manufactured to produce a high modulus graphite fiber finished good 80 and wound to the material receiving element 21, and the winding machine 20 has a winding speed of 0.1~20 m/min.

The low-temperature furnace 30 is installed between the material supply module 10 and the winding machine 20 for removing an original protective film on the surface of the carbon fiber raw material 70, and the temperature of the low-temperature furnace is controlled at a range of 500~800° C.

The microwave graphitization module 40 is coupled to the rear of the low-temperature furnace 30 and includes a microwave cavity 41, and a microwave supply module 42 and a gas supply module 43 interconnected to the microwave cavity 41 for performing a graphitization of the carbon fiber raw material 70 to produce a graphite fiber semi-finished good 80'. Wherein, the manufacturing device of the present invention further comprises first and second tension wheel sets 61, 62 installed at the front and the rear of the microwave graphitization module 40 respectively, and the first and second tension wheel sets 61, 62 have a plurality of wheels 63 respectively, and the rolling and pressing effects of each wheel 63 maintain a specific tension of the carbon fiber raw material 70 and pass the carbon fiber raw material 70 through the microwave graphitization module 40 at a specific speed.

The gluing module 60 is coupled to the rear of the microwave graphitization module 50 for performing a gluing process of the graphite fiber semi-finished good 80' to form a protective film (not shown in the figure) on the surface of the graphite fiber semi-finished good 80' to produce a high modulus graphite fiber finished good 80, and the high modulus graphite fiber finished good 80 is wound onto the material receiving element 21 of the winding machine. Of course, a thermal bake-dry module 90 can be installed between the material supply module 10 and the winding machine 20 and coupled to the rear of the gluing module 60 for providing a temperature of 150~500° C. to bake dry and shape the graphite fiber semi-finished good.

Figure 4:
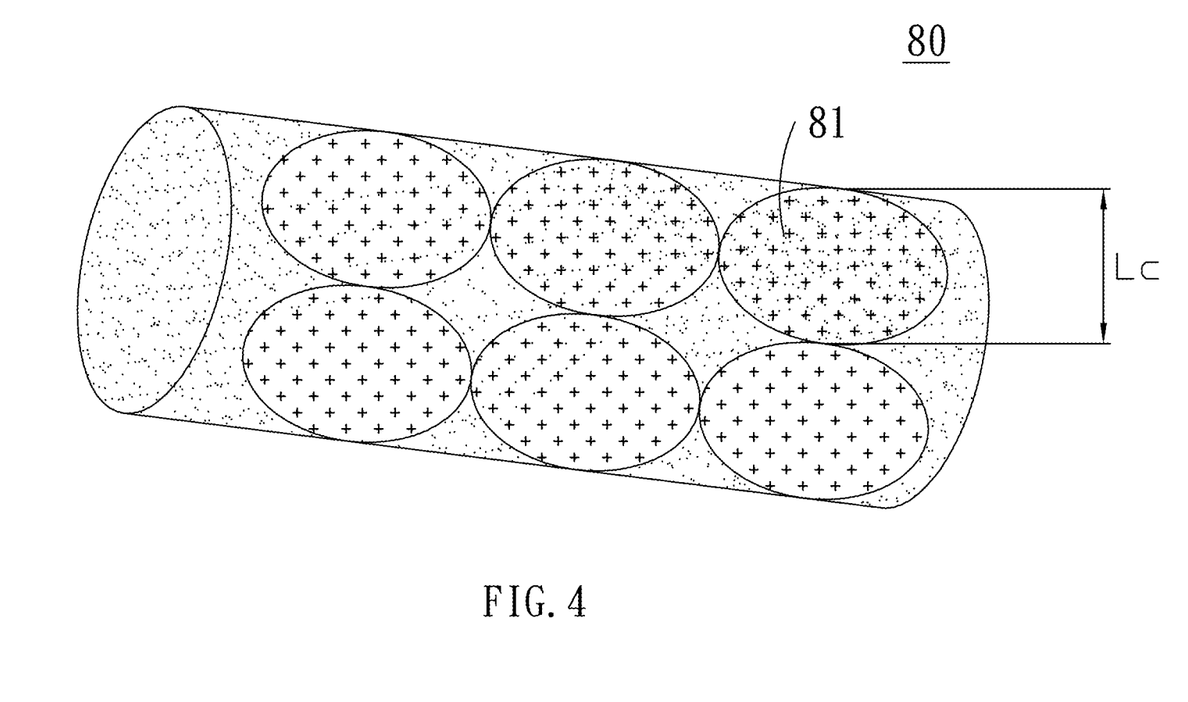
FIG. 4 a schematic view of a high modulus graphite fiber of the present invention.

Wherein, the high modulus graphite fiber finished good 80 manufactured by the manufacturing device of the present invention has a tensile modulus of 270~650 GPa, and a plurality of crystal structures 81 as shown in FIG. 4, and the crystal structure 81 has a thickness (Lc) of 20~70 angstroms.

Figure 5:
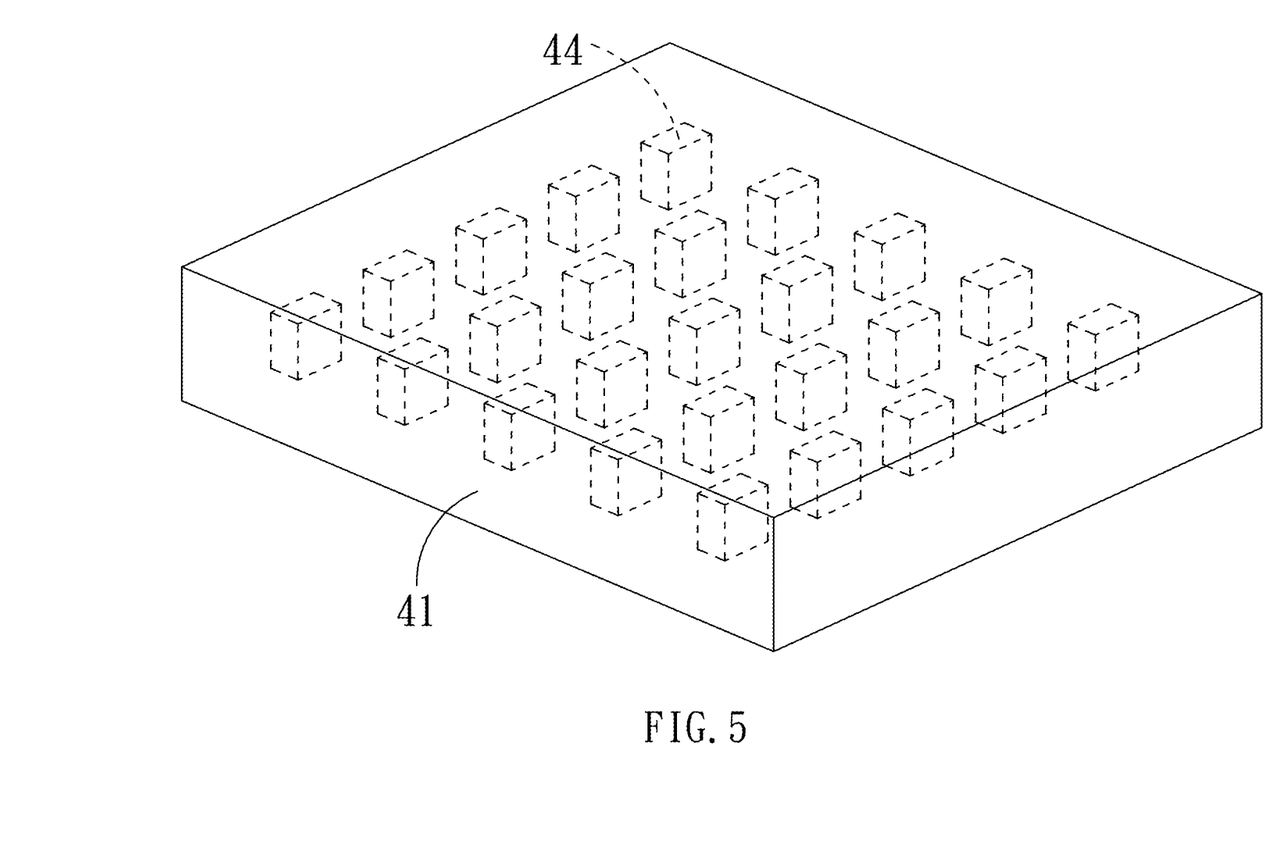
FIG. 5 is a schematic view of a microwave cavity in accordance with a first preferred embodiment of the present invention.

In addition, the microwave cavity 41 of the first preferred embodiment is in a flat-plate shape as shown in FIG. 5, and the gas supply module supplies an inert gas into the microwave cavity 41 to prevent the carbon fiber raw material from being attached or ashed by the high-temperature oxygen in the carbonization process. The inert gas can be nitrogen, argon, helium or any combination of the above. Under the protection of the inert gas atmosphere, the microwave supply module supplies an electric field of high frequency microwaves and produces a sensing current to heat up and produce a high temperature quickly with the carbon fiber raw material passing through the microwave field concentration area, so that the carbon fiber raw material can increase the graphitization temperature to a range of 1400~3000° C. within a short time and can complete the graphitization process in 0.5~10 minutes. Of course, the microwave cavity 41 can further comprise a wave absorbing structure 44 made of a material highly sensitive to microwaves, and such material includes graphite, a carbide, a magnetic compound, a nitride, an ion compound, or any combination of the above. In the preferred embodiment as shown in the figure, the wave absorbing structure 44 an be arranged in a matrix on the flat-plate shaped microwave cavity 41 to enhance the focusing effect of microwave field and accelerate the graphitization process.

Figure 6:
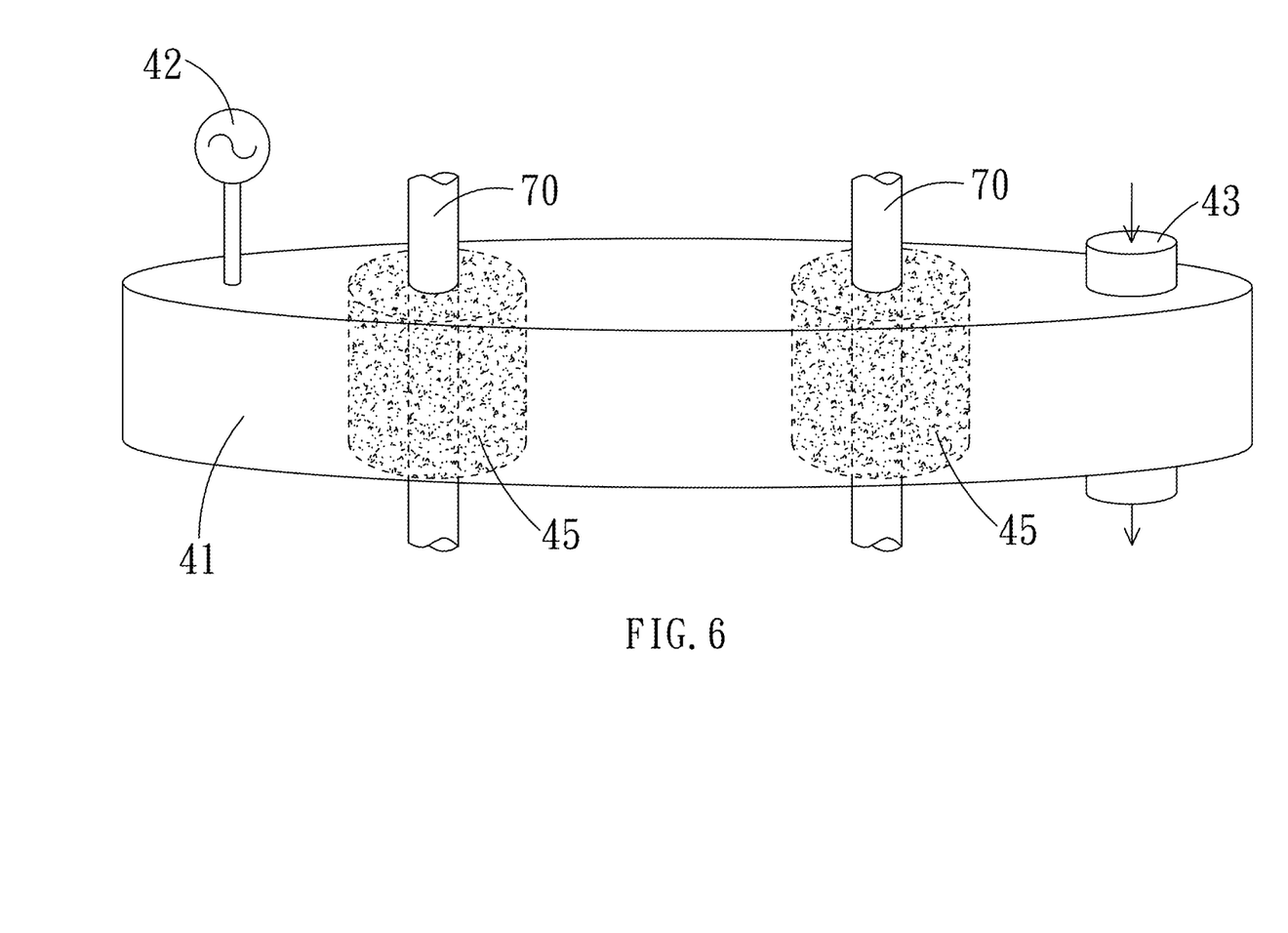
FIG. 6 is a schematic view of a microwave cavity in accordance with a second preferred embodiment of the present invention.

In addition, the microwave cavity 41 of the second preferred embodiment is in an elliptical shape as shown in FIG. 6, wherein a microwave field concentration area 45 is formed separately at two focal points in the elliptical microwave cavity 41 to produce a sensing current to heat up and produce a high temperature quickly to the carbon fiber raw material 70 passing through the microwave field concentration area 45, so that the carbon fiber raw material 70 can increase the graphitization temperature to a range of 1400~3000° C. within a short time and can complete the graphitization process in 0.5~10 minutes. Similarly, the microwave cavity can further include a wave absorbing structure to enhance the focusing effect of the microwave field.

Figure 7A:
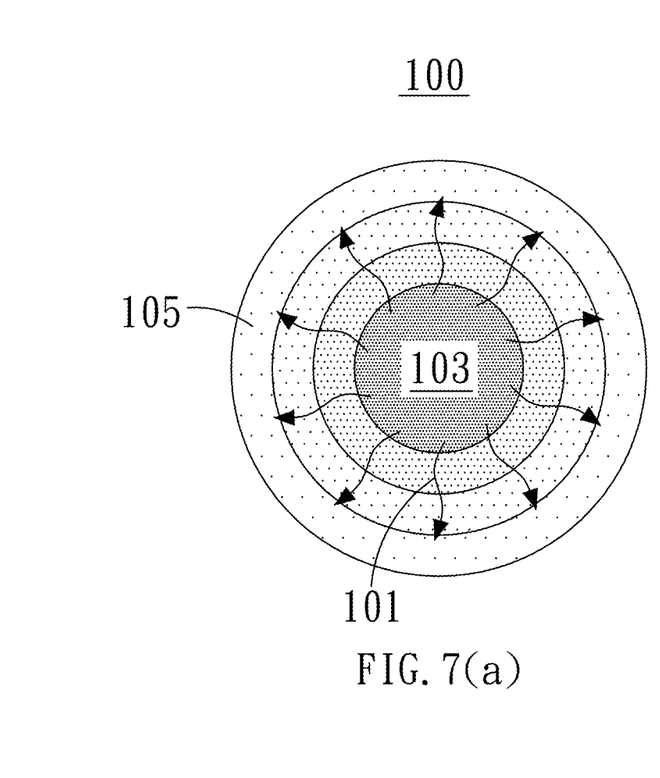
FIG. 7(a) is a schematic view of a heat conduction of a microwave assisted graphitization process in accordance with the present invention.
Figure 7B:
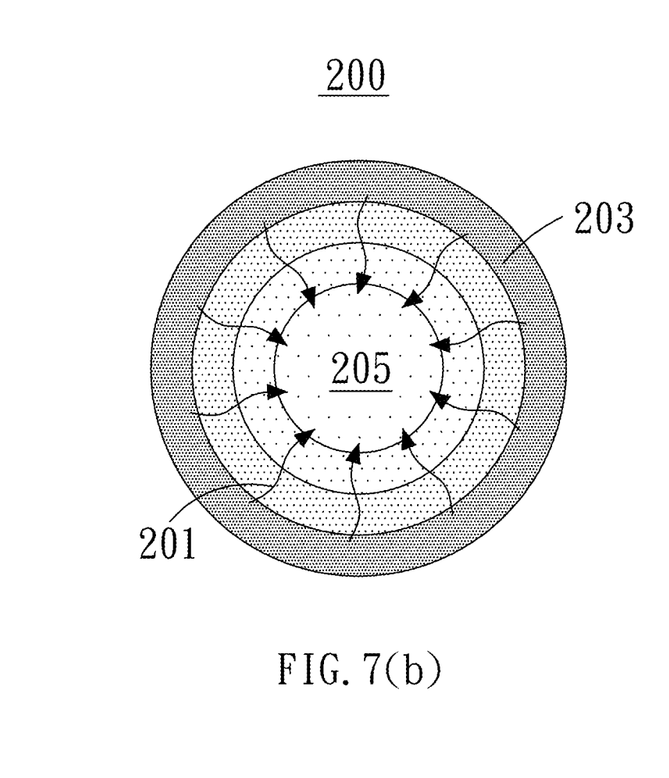
FIG. 7(b) is a schematic view of a heat conduction of a conventional external heating graphitization process.

Since the heating process by microwave energy a self heat-generating process. Unlike the conventional external heating process by thermal conduction, radiation or convection (Most present heating technologies such as the high temperature electric furnace can provide a heating speed of 10~15° C./minute, which is equivalent to the temperature increasing speed of 0.13~0.25° C./second). With reference to FIGS. 7(a) and 7(b), the high temperature area 103 of the microwave graphitization 100 of the present invention is disposed inside, and the low temperature area 105 is disposed outside, so that a heat flow 101 flows in a direction from the inside to the outside. On the other hand, the high temperature area 203 of the conventional external heating graphitization 200 is disposed outside, and the low temperature area 205 is disposed inside, so that the heat flow 201 flows from the outside to the inside, and the flowing directions of the two are opposite to each other. As a result, when the carbon atoms in the carbon fiber material of the present invention are graphitized and stacked, the internal temperature of the fiber is higher than the temperature of the surface of the fiber, and the graphitization layer tends to grow in the thickwise direction to form a structure with the crystal thickness Lc.

In the meantime, the microwave can reduce the energy barrier required to overcome the molecular motion, so that the time for rearranging the carbon atoms can be shortened to form the densely stacked graphite layer quickly. The thickness of the graphite crystal is even greater than the thickness obtained from the conventional manufacturing process, so that the invention can improve the graphitization efficiency and reduce the manufacturing cost.

In summation of the description above, the present invention provides a feasible manufacturing device of a high modulus graphite fiber and complies with patent application requirements, and is thus duly filed for patent application. While the invention has been described by means of specific embodiments, numerous modifications and variations could be made thereto by those skilled in the art without departing from the scope and spirit of the invention set forth in the claims.

What is claimed is:

1. A manufacturing device of high modulus graphite fibers, comprising:
    a material supply module, for supplying a carbon fiber raw material;
    a winding machine, installed at the rear of the material supply module, and having at least one material receiving element, and an end of the raw material of the carbon fibers being wound to the material supply module, and the other end being manufactured to a finished good of a high modulus graphite fiber and then wound to the material receiving element;
    a low-temperature furnace, installed between the material supply module and the winding machine;
    a microwave graphitization module, coupled to the rear of the low-temperature furnace, and having a microwave cavity, a microwave supply module and a gas supply module interconnected to the microwave cavity for performing a graphitization of the raw material of the carbon fibers to produce a graphite fiber semi-finished good; and
    a gluing module, installed at the rear of the microwave graphitization module for performing a gluing process of the graphite fiber semi-finished good to produce a high modulus graphite fiber finished good to be wound onto the material receiving element of the winding machine, and the high modulus graphite fiber having a tensile modulus of 270~650 GPa, and a plurality of crystal structures with a thickness (Lc) of 20~70 angstroms,
    wherein the microwave cavity is in an elliptical shape.

2. The manufacturing device of high modulus graphite fibers according to claim 1, further comprising first and second tension wheel sets installed at the front and the rear of the microwave graphitization module respectively, and the first and second tension wheel sets having a plurality of wheels.

3. The manufacturing device of high modulus graphite fibers according to claim 2, further comprising a thermal bake-dry module installed between the material supply module and the winding machine and coupled to the rear of the gluing module for baking dry and shaping the graphite fiber semi-finished good.

4. The manufacturing device of high modulus graphite fibers according to claim 2, wherein the thermal bake-dry module provides a temperature of 150~500° C.

5. The manufacturing device of high modulus graphite fibers according to claim 1, wherein the microwave cavity further includes a wave absorbing structure installed therein.

6. The manufacturing device of high modulus graphite fibers according to claim 1, wherein the gas supply module supplies an inert gas into the microwave cavity.

7. The manufacturing device of high modulus graphite fibers according to claim 1, wherein the winding machine has a winding speed of 0.1~20 meter/minute.

8. The manufacturing device of high modulus graphite fibers according to claim 1, wherein the low-temperature furnace has a temperature of 500~800° C.

9. A manufacturing device of high modulus graphite fibers, comprising:
    a material supply module, for supplying a carbon fiber raw material;
    a winding machine, installed at the rear of the material supply module, and having at least one material receiving element, and an end of the raw material of the carbon fibers being wound to the material supply module, and the other end being manufactured to a finished good of a high modulus graphite fiber and then wound to the material receiving element;
    a low-temperature furnace, installed between the material supply module and the winding machine;
    a microwave graphitization module, coupled to the rear of the low-temperature furnace, and having a microwave cavity, a microwave supply module and a gas supply module interconnected to the microwave cavity for performing a graphitization of the raw material of the carbon fibers to produce a graphite fiber semi-finished good; and
    a gluing module, installed at the rear of the microwave graphitization module for performing a gluing process of the graphite fiber semi-finished good to produce a high modulus graphite fiber finished good to be wound onto the material receiving element of the winding machine, and the high modulus graphite fiber having a tensile modulus of 270~650 GPa, and a plurality of crystal structures with a thickness (Lc) of 20~70 angstroms,
    wherein the microwave cavity is in a flat-plate shape.

10. The manufacturing device of high modulus graphite fibers according to claim 9, wherein the microwave cavity further includes a wave absorbing structure installed therein.

11. The manufacturing device of high modulus graphite fibers according to claim 10, wherein the wave absorbing structure is arranged in a matrix in the flat-plate shaped microwave cavity.

12. The manufacturing device of high modulus graphite fibers according to claim 9, wherein the gas supply module supplies an inert gas into the microwave cavity.

13. The manufacturing device of high modulus graphite fibers according to claim 9, further comprising first and second tension wheel sets installed at the front and the rear of the microwave graphitization module respectively, and the first and second tension wheel sets having a plurality of wheels.

14. The manufacturing device of high modulus graphite fibers according to claim 13, further comprising a thermal bake-dry module installed between the material supply module and the winding machine and coupled to the rear of the gluing module for baking dry and shaping the graphite fiber semi-finished good.

15. The manufacturing device of high modulus graphite fibers according to claim 13, wherein the thermal bake-dry module provides a temperature of 150~500° C.

16. The manufacturing device of high modulus graphite fibers according to claim 9, wherein the winding machine has a winding speed of 0.1~20 meter/minute.

17. The manufacturing device of high modulus graphite fibers according to claim 9, wherein the low-temperature furnace has a temperature of 500~800° C.

* * * * *